April 29, 1969            O. S. GROP            3,441,358
GAS LIGHTER HAVING A LEVER ACTUATED EXPANSIBLE VALVE MEANS
Filed Jan. 2, 1964
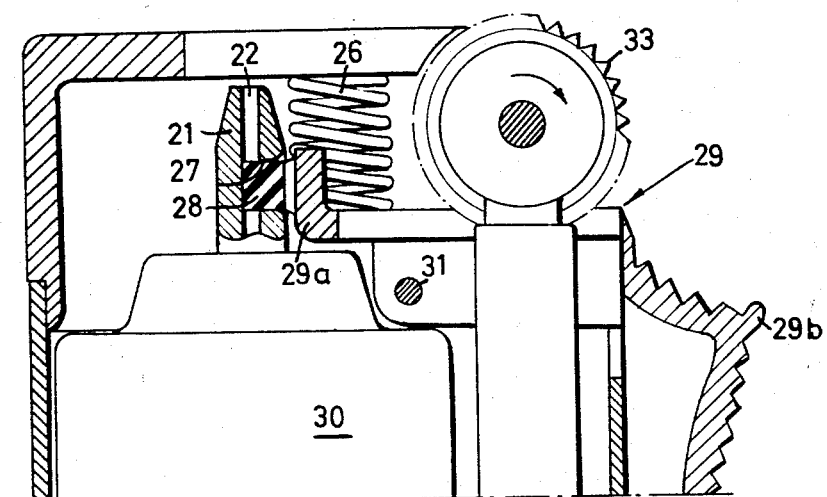

United States Patent Office 3,441,358
Patented Apr. 29, 1969

3,441,358
GAS LIGHTER HAVING A LEVER ACTUATED EXPANSIBLE VALVE MEANS
Olof Sune Grop, Maratonvagen 78, Enskede, Sweden
Filed Jan. 2, 1964, Ser. No. 335,297
Claims priority, application Sweden, Jan. 9, 1963, 204/63
Int. Cl. F23q 7/12, 2/16
U.S. Cl. 431—143   1 Claim

ABSTRACT OF THE DISCLOSURE

A gas lighter of the fluid and friction wheel type has a shut off valve which is comprised of a plug of elastic material that normally protrudes into and blocks the fuel duct through a lateral opening in its wall. The plug is actuated and normally pressed into the fuel duct by one arm of a spring-biased, two-armed lever which is so mounted below the friction wheel that a person's finger leaving said friction wheel must invariably fall on the second arm of the lever to thereby release the pressure against the plug and partly unblock the fuel duct.

Background of the invention

Cigarette lighter shut off valves of the prior art are mostly comprised of a great plurality of different parts most of which are movable. On account thereof these valves are comparatively expensive in manufacture and mounting. The principal object of the invention is to reduce the complexity of shut off valves for gas lighters without sacrificing their reliability.

Summary of the invention

The objects of the invention are attained by a valve means which comprises a transverse opening in the wall of a tubular fuel duct and a plug of resilient material which is associated with the free end of a first arm and protrudes through said opening into said fuel duct for complete blocking thereof under the influence of a biasing means in the normal inoperative position of the lighter, said lever being rotated against the bias of said spring means to its actuated position, in which said plug partly unblocks said fuel duct, by a finger falling down upon said second arm after having rotated said friction wheel.

More particularly, the invention relates to a valve structure for use with a gas lighter comprising an outer casing, a container for a vaporizable fuel in said casing, a burner nozzle, a tubular fuel duct leading from said fuel container to said fuel nozzle, a rotatable friction wheel partly projecting from one end of said casing and mounted at one side of said fuel duct, a two-armed lever which is rockably journalled on an axis located between said fuel duct and said friction wheel and having its first arm associated with shut off valve means for said fuel duct and its second arm located at said end of said casing substantially on the opposite side of said friction wheel from said fuel nozzle and below said friction wheel, whereby a person's finger leaving said friction wheel must invariably fall on said second arm of said lever, and spring means biasing said lever to its normal position in which said lever maintains said shut off valve closed.

Other features of and advantages of the device according to the invention will be evident from the following detailed description and the accompanying drawing, which diagrammatically and as a nonlimiting example illustrates one preferred embodiment, and in which: the single figure is a longitudinal sectional view of the upper portion of a lighter with the improved shut-off valve means according to the invention.

The illustrated gas lighter has a burner nozzle 21, which belongs to or forms part of a fuel container 30, possibly with a built-in pressure reducing valve. The numeral 22 designates a tubular fuel duct, which leads to and penetrates the burner nozzle 21, which can constitute a continuation of a wick, which functions as a pressure reducing valve. A lateral opening 27 is made in the wall of the tubular fuel duct, and in this opening a small plug 28 of rubber or another elastic material is so inserted, that when it is elastically deformed by the influence of the pressure from a control or shut-off means 29, it will completely block the whole cross-sectional area of the fuel duct 22. The control means 29 consists of a two-armed lever which is pivotable on a pivot shaft 31 and the two arms of which are designated 29a and 29b respectively. The arm 29a is biased by a spring 26 or the like to maintain the shut off valve means comprised of the plug 28 closed, and the member 29 may be manipulated by a downwards directed pressure on the lever 29b, onto which the finger will slip down after having rotated the friction wheel 33 to a position in which the plug 28 resumes its undeformed condition and thereby unblocks at least a portion of the flow area of the fuel duct 22, that is, decreases the blocking degree and opens the valve.

What is claimed is:
1. A gas lighter comprising an outer casing, a container for a vaporizable fuel in said casing, a burner nozzle, a tubular fuel duct leading from said fuel container to said fuel nozzle, a rotatable friction wheel partly projecting from one end of said casing and mounted at one side of said fuel duct, a two-armed lever which is rockably journalled on an axis located between said fuel duct and said friction wheel and having its first arm associated with shut off valve means for said fuel duct and its second arm located at said end of said casing substantially on the opposite side of said friction wheel from said fuel nozzle and below said friction wheel, whereby a person's finger leaving said friction wheel must invariably fall on said second arm of said lever, and spring means biasing said lever to its normal position in which said lever maintains said shut off valve closed, characterized in that said valve means are comprised of a transverse opening in the wall of said tubular fuel duct and a plug of resilient material which is associated with the free end of said first arm and protrudes through said opening into said fuel duct for complete blocking thereof under the influence of said biasing means in the normal inoperative position of the lighter, said lever being rotated against the bias of said spring means to its actuated position, in which said plug partly unblocks said fuel duct, by a finger falling down upon said second arm after having rotated said friction wheel.

References Cited

UNITED STATES PATENTS

| | | | |
|---|---|---|---|
| 3,122,907 | 3/1964 | Gilberton | 431—143 |
| 2,348,083 | 5/1944 | McCabe | 251—335 XR |
| 2,506,837 | 5/1950 | Kochner | 251—335.1 XR |
| 3,180,580 | 4/1965 | Schedel | 251—331 XR |
| 1,521,081 | 12/1924 | Dooling | 251—191 X |
| 1,883,960 | 10/1932 | Koppel et al. | 251—4 |
| 2,442,746 | 6/1948 | Anderson et al. | 251—4 |
| 2,925,246 | 2/1960 | Sardeson | 251—191 |
| 3,039,733 | 6/1962 | Mattioli | 251—5 |
| 3,122,907 | 3/1964 | Gilberton | 431—143 |

FOREIGN PATENTS 87,514  2/1958  Netherlands.

WILLIAM F. O'DEA, *Primary Examiner.*

RICHARD GERARD, *Assistant Examiner.*

U.S. Cl. X.R.

251—191; 431—254, 277